United States Patent
Bratvedt et al.

(10) Patent No.: US 10,914,864 B2
(45) Date of Patent: Feb. 9, 2021

(54) MULTISCALE METHOD FOR RESERVOIR MODELS

(71) Applicant: Schlumberger Technology Corporation, Sugar Land, TX (US)

(72) Inventors: Kyrre Bratvedt, Katy, TX (US); Carlos Boneti, Houston, TX (US); Jostein Natvig, Oslo (NO); Zhuoyi Li, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 1521 days.

(21) Appl. No.: 14/636,319

(22) Filed: Mar. 3, 2015

(65) Prior Publication Data
US 2016/0018562 A1    Jan. 21, 2016

Related U.S. Application Data

(60) Provisional application No. 62/025,324, filed on Jul. 16, 2014.

(51) Int. Cl.
*G01V 99/00* (2009.01)
*G06F 17/16* (2006.01)

(52) U.S. Cl.
CPC ............ *G01V 99/005* (2013.01); *G06F 17/16* (2013.01)

(58) Field of Classification Search
CPC ....... G01V 99/00; G01V 99/005; G06F 17/16
See application file for complete search history.

(56) References Cited

U.S. PATENT DOCUMENTS

| 5,960,371 | A | 9/1999 | Saito et al. |
|---|---|---|---|
| 6,823,297 | B2 | 11/2004 | Jenny et al. |
| 6,862,530 | B2 | 3/2005 | Fleury et al. |
| 7,224,162 | B2 | 5/2007 | Proett et al. |
| 7,281,213 | B2 | 10/2007 | Callegari |
| 7,409,438 | B2 | 8/2008 | McConnell et al. |
| 7,496,488 | B2 * | 2/2009 | Jenny ............... E21B 43/00 703/10 |
| 7,546,229 | B2 | 6/2009 | Jenny et al. |

(Continued)

OTHER PUBLICATIONS

Zhou, H. "Operator Based Multiscale Method for Compressible Flow" Thesis, Stanford U. (2006).*

(Continued)

*Primary Examiner* — Jay Hann (57) ABSTRACT

Methods, computing systems, and computer-readable media for multi-scale modeling. The method includes determining a first matrix for a plurality of fine cells of a model based at least in part on a physical property value represented by respective fine cells, identifying one or more overlapped cells of the plurality of fine cells that are part of at least two of the plurality of subdomains, and determining a second matrix. Determining the second matrix includes determining an intermediate product by multiplying the first matrix by a prolongation matrix, which includes predicting a row of zeros in the intermediate product for the plurality of fine cells that are not the one or more overlapped cells and are not part of the at least two of the plurality of subdomains that include the one or more overlapped cells. Determining the second matrix also includes multiplying the intermediate product by a restriction matrix.

17 Claims, 5 Drawing Sheets

(56) References Cited

U.S. PATENT DOCUMENTS

| | | |
|---|---|---|
| 7,603,238 B2 | 10/2009 | Valero et al. |
| 7,702,463 B2 | 4/2010 | Levin |
| 7,765,091 B2 | 7/2010 | Lee et al. |
| 7,995,057 B2 | 9/2011 | Chuter |
| 8,204,726 B2 | 6/2012 | Lee et al. |
| 8,219,322 B2 | 7/2012 | Monsen et al. |
| 8,301,429 B2 | 10/2012 | Hajibeygi et al. |
| 8,346,523 B2 | 1/2013 | Lee et al. |
| 8,548,782 B2* | 10/2013 | Hsu ............... G01V 99/005 703/10 |
| 8,594,986 B2 | 11/2013 | Lunati |
| 8,630,831 B2 | 1/2014 | Bratvedt et al. |
| 8,650,016 B2* | 2/2014 | Lunati ............... G01V 99/00 703/10 |
| 8,798,977 B2 | 8/2014 | Hajibeygi et al. |
| 8,818,728 B2 | 8/2014 | Johnston |
| 8,908,925 B2 | 12/2014 | Hurley et al. |
| 8,909,508 B2 | 12/2014 | Hurley et al. |
| 2004/0210392 A1 | 10/2004 | Fleury et al. |
| 2010/0004908 A1* | 1/2010 | Lunati ............ G06F 17/5018 703/10 |
| 2011/0098998 A1 | 4/2011 | Lunati et al. |
| 2012/0221306 A1 | 8/2012 | Hurley et al. |
| 2013/0046524 A1 | 2/2013 | Gathogo et al. |
| 2013/0204588 A1 | 8/2013 | Copeland |

OTHER PUBLICATIONS

Hui, et al., "Operator-Based Multiscale Method for Compressible Flow", Jun. 1, 2008, SPE Journal, vol. 13, No. 2, pp. 267-273.
Extended European Search Report issued in related EP application 15306163.5 dated Dec. 22, 2015, 8 pages.

* cited by examiner

$$A = \begin{matrix} -2 & 1 & 0 & 1 & 0 & 0 & 0 & 0 & 0 \\ 1 & -3 & 1 & 0 & 1 & 0 & 0 & 0 & 0 \\ 0 & 1 & -3 & 1 & 0 & 1 & 0 & 0 & 0 \\ 1 & 0 & 1 & -4 & 1 & 0 & 1 & 0 & 0 \\ 0 & 1 & 0 & 1 & -4 & 1 & 0 & 1 & 0 \\ 0 & 0 & 1 & 0 & 1 & -4 & 1 & 0 & 1 \\ 0 & 0 & 0 & 1 & 0 & 1 & -3 & 1 & 0 \\ 0 & 0 & 0 & 0 & 1 & 0 & 1 & -3 & 1 \\ 0 & 0 & 0 & 0 & 0 & 1 & 0 & 1 & -2 \end{matrix}$$

MULTISCALE METHOD FOR RESERVOIR MODELS

CROSS-REFERENCE TO RELATED APPLICATIONS

This application claims priority to U.S. Provisional Patent Application Ser. No. 62/025,324 filed on Jul. 16, 2014, which is incorporated by reference herein in its entirety.

BACKGROUND

Detailed digital models of subterranean volumes or "domains," such as areas in and around oilfield reservoirs, are developed from data collected about the domains. Such data can include well logs, seismic data, core data, and the like. The data is then processed and used to form the models of the domains, which can be visualized, manipulated, etc.

The models are then discretized into subdomains, such as control volumes or "cells," generally by applying one or more gridding algorithms. For example, the cells can be referenced by Cartesian coordinates, which may allow quick reference to an individual cell. Other types of grids are also used. Mass balances may then be calculated for fluid flow between the cells over time, e.g., by applying a timestep. After each timestep, the mass balance equations are re-calculated, which may allow fluid flow to be tracked and modeled in the subterranean domain.

The amount of the data collected may be vast, sometimes reaching terabytes or more. This may allow for fine-scale resolution of the subterranean domain, which may provide for detailed simulation of fluid flow in, or other aspects of, the domain. However, the number of computations to be performed increases as the number of cells increase, i.e., as the resolution becomes finer. This can lead to long runtimes to perform the simulation calculations. High-performance computing clusters, parallel processing, graphical-processing units, etc. have been employed to reduce the runtimes, basically by enabling the calculations to be done at a higher rate. However, even with such resources, the runtimes can reach into days or weeks.

Accordingly, reservoir simulations often take steps to reduce the number of calculations. One way to do this is by "upscaling." Upscaling generally means combining two or more cells together, and using some combination of their property values to result in a larger cell. While this may reduce the number of calculations to be performed, the cost is a loss of resolution. Another way to more efficiently conduct simulations is to use a "multiscale" gridding method. Multiscale methods may generally include developing a coarse-scale pressure equation from the elliptical pressure equation and reconstructing the fine-scale pressure field via basis functions.

SUMMARY

Embodiments of the disclosure may provide a method for multi-scale modeling including obtaining a model of a subterranean domain, with the model including a plurality of fine cells and a plurality of subdomains. Respective subdomains of the plurality of subdomains comprise two or more of the plurality of fine cells. The method also includes determining a first matrix for the plurality of fine cells based at least in part on a physical property value represented by respective fine cells of the plurality of fine cells, and identifying one or more overlapped cells of the plurality of fine cells that are part of at least two of the plurality of subdomains. The method further includes determining, using a processor, a second matrix. Determining the second matrix includes determining an intermediate product by multiplying the first matrix by a prolongation matrix. Determining the intermediate product includes predicting a row of zeros in the intermediate product for the plurality of fine cells that are not the one or more overlapped cells and are not part of the at least two of the plurality of subdomains that include the one or more overlapped cells, and multiplying the intermediate product by a restriction matrix. The method further includes adjusting the model based at least partially on the second matrix.

Embodiments of the disclosure may also include a computing system. The computing system includes one or more processors, and a memory system including one or more non-transitory computer-readable media storing instructions that, when executed by at least one of the one or more processors, cause the computing system to perform operations. The operations include obtaining a model of a subterranean domain, the model comprising a plurality of fine cells and a plurality of subdomains. Respective subdomains of the plurality of subdomains comprise two or more of the plurality of fine cells. The operations also include determining a first matrix for the plurality of fine cells based at least in part on a physical property value represented by respective fine cells of the plurality of fine cells, and identifying one or more overlapped cells of the plurality of fine cells that are part of at least two of the plurality of subdomains. The operations also include determining a second matrix. Determining the second matrix includes determining an intermediate product by multiplying the first matrix by a prolongation matrix. Determining the intermediate product includes predicting a row of zeros in the intermediate product for the plurality of fine cells that are not the one or more overlapped cells and are not part of the at least two of the plurality of subdomains that include the one or more overlapped cells, and multiplying the intermediate product by a restriction matrix. The operations also include adjusting the model based at least partially on the second matrix.

Embodiments of the disclosure may also include a non-transitory computer-readable medium storing instructions that, when executed by one or more processors of a computing system, cause the computing system to perform operations. The operations include The operations include obtaining a model of a subterranean domain, the model comprising a plurality of fine cells and a plurality of subdomains. Respective subdomains of the plurality of subdomains comprise two or more of the plurality of fine cells. The operations also include determining a first matrix for the plurality of fine cells based at least in part on a physical property value represented by respective fine cells of the plurality of fine cells, and identifying one or more overlapped cells of the plurality of fine cells that are part of at least two of the plurality of subdomains. The operations also include determining a second matrix. Determining the second matrix includes determining an intermediate product by multiplying the first matrix by a prolongation matrix. Determining the intermediate product includes predicting a row of zeros in the intermediate product for the plurality of fine cells that are not the one or more overlapped cells and are not part of the at least two of the plurality of subdomains that include the one or more overlapped cells, and multiplying the intermediate product by a restriction matrix. The operations also include adjusting the model based at least partially on the second matrix.

In an embodiment, the physical property includes pressure in the subterranean domain at respective locations represented by the respective fine cells of the plurality of fine cells.

In an embodiment, the plurality of subdomains include a plurality of dual coarse grid cells, wherein one or more values represented by the plurality of dual coarse grid cells are calculated based at least in part on a basis function for at least one physical characteristic.

In an embodiment, the model further includes a plurality of coarse cells. Each of the plurality of coarse cells contains two or more of the plurality of fine cells.

In an embodiment, the plurality of coarse cells do not overlap.

In an embodiment, the one or more overlapped cells include a subset of the plurality of fine cells that are located proximal to an interface between two of the plurality of coarse cells.

In an embodiment, predicting the row of zeros in the intermediate product includes setting elements of the row in the intermediate product to zero without performing a matrix multiplication operation for the row.

In an embodiment, the prolongation matrix multiplied by a first vector representing the physical property value in the one or more overlapped cells equals a second vector representing the physical property value in the plurality of fine cells. Further, a source/sink vector for the one or more overlapping cells is equal to the restriction matrix multiplied by a source/sink vector for the plurality of fine cells, and the second matrix multiplied by the first vector equals the source/sink vector for the one or more overlapping cells.

In an embodiment, the method and/or operations also include displaying the model after adjusting the model.

In an embodiment, the model is constructed based on data collected from a physical source, the physical source comprising at least one of a seismic acquisition device, a well-logging device, or a core-sampling device.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

Figure 1:
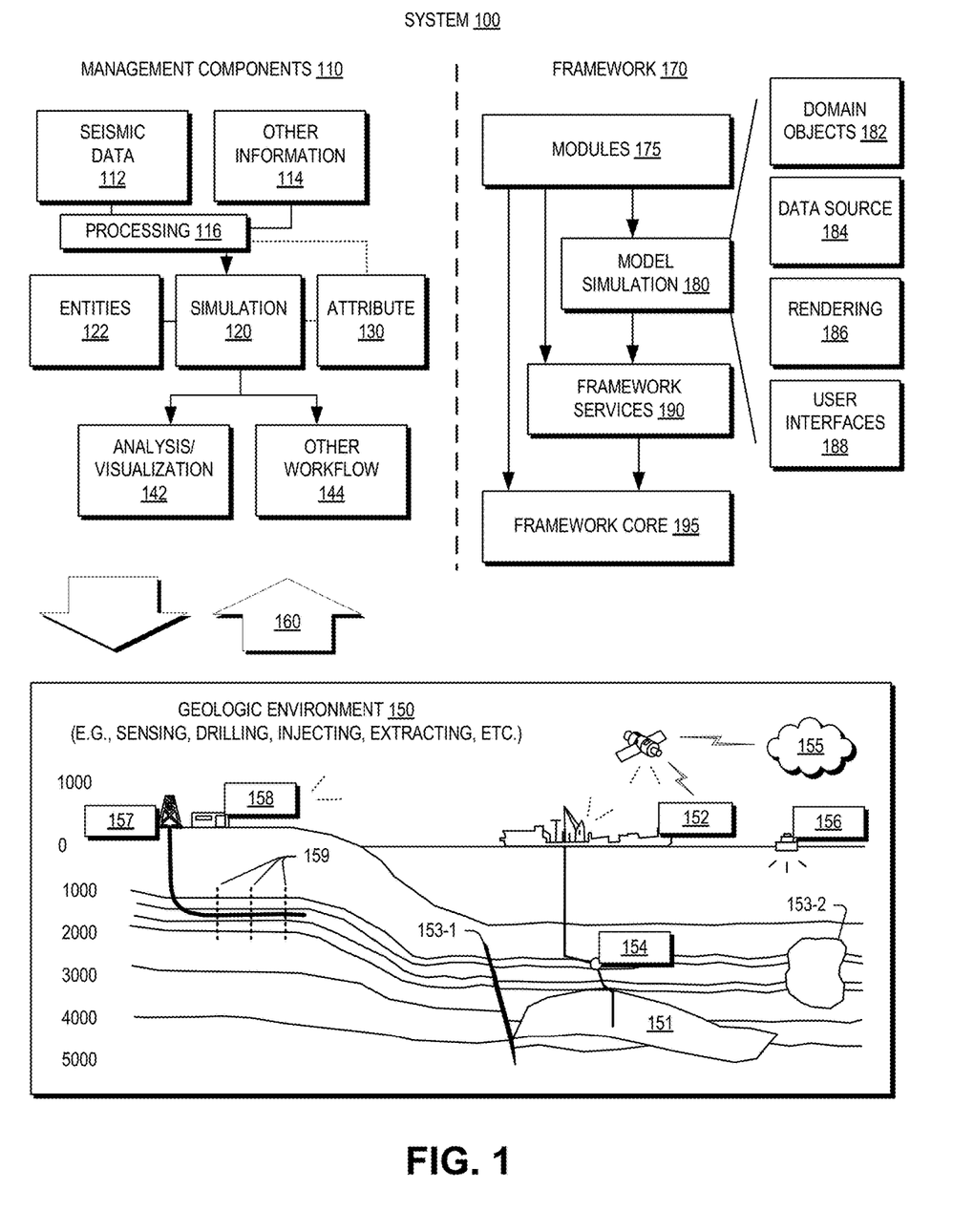
FIG. 1 illustrates an example of a system that includes various management components to manage various aspects of a geologic environment, according to an embodiment.

FIG. 1 illustrates an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® .NET® framework (Redmond, Wash.), which provides a set of extensible object classes. In the .NET® framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Tex.), the INTERSECT™ reservoir simulator (Schlumberger Limited, Houston Tex.), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Tex.) allows for integration of add-ons (or plug-ins) into a PETREL® framework workflow. The OCEAN® framework environment leverages .NET® tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or instead include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a workstep may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Figure 2:
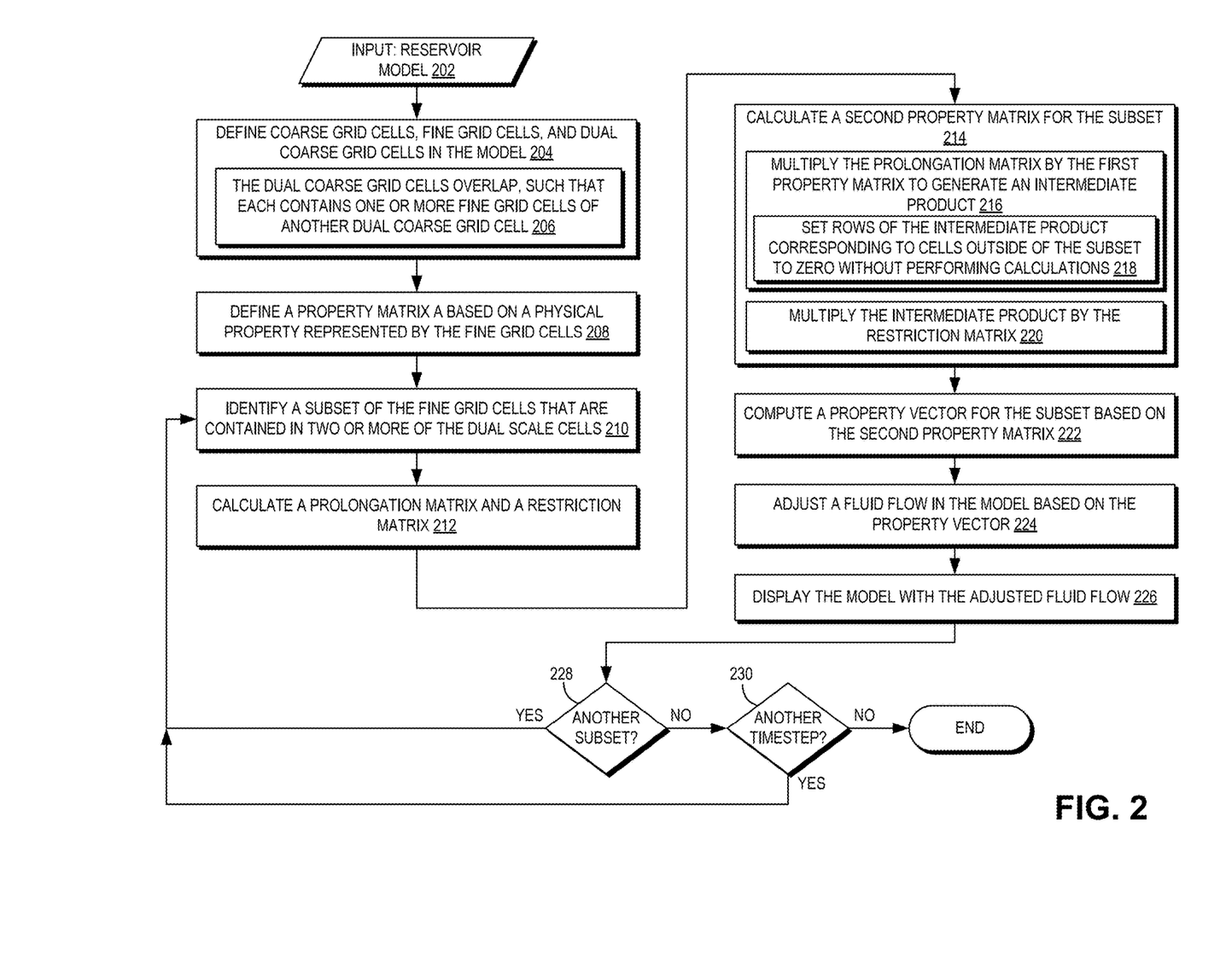
FIG. 2 illustrates a flowchart of a method for multiscale modeling, according to an embodiment.

FIG. 2 illustrates a flowchart of a method 200 for multi-scale modeling, according to an embodiment. The method 200 may begin by receiving, generating, or otherwise obtaining a reservoir model, e.g., a digital representation of a subterranean volume or domain, as at 202. The digital representation may be based on data collected in the field, synthetic data, and/or the like. The collected data may be collected using one or more physical devices, such as seismic data acquisition devices or equipment (e.g., geophones), well-logging devices, core sample analyzing devices, and/or the like. Accordingly, in some embodiments, the method 200 may commence by performing operations on a model that has already been constructed, but in other embodiments, may include constructing the model.

Figure 3A:
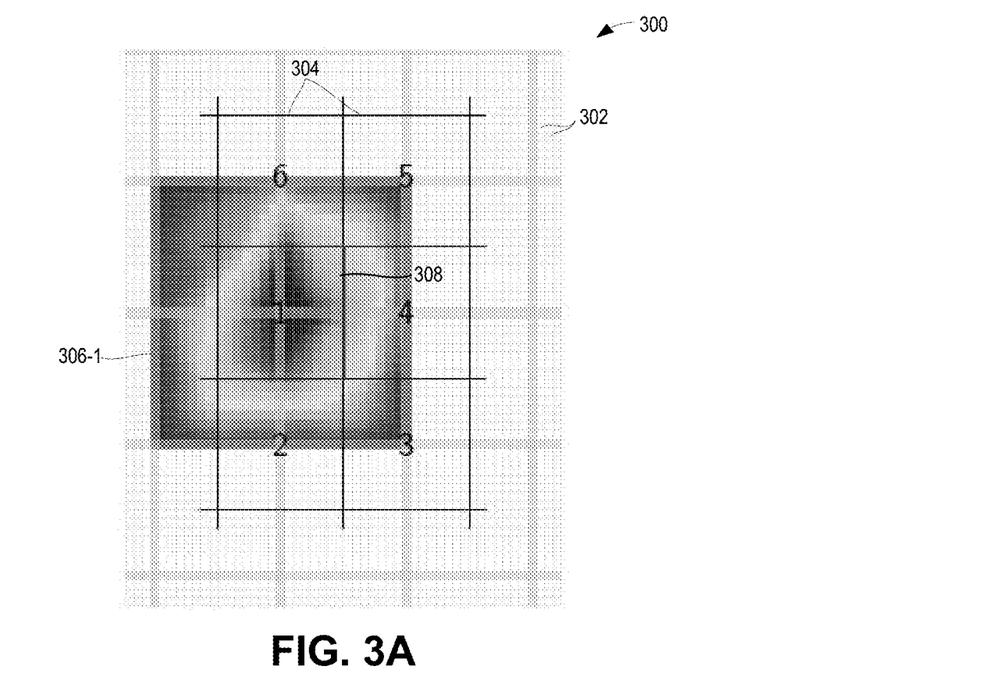
FIGS. 3A and 3B illustrate a conceptual view of a grid of a model, according to an embodiment.
Figure 3B:
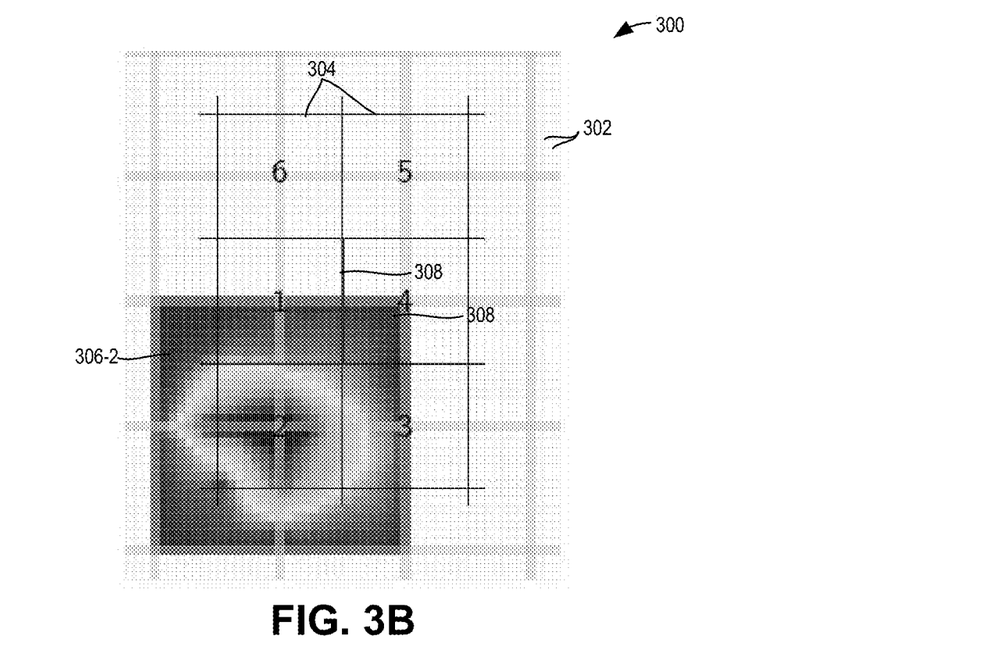

The method 200 may also include defining coarse grid cells, fine grid cells, and dual coarse grid cells (or "subdomains") in the model, as at 204. Referring now to FIGS. 3A and 3B, there are shown two conceptual views of a grid 300, which may be provided as part of the model, according to an embodiment. In general, grids, such as grid 300, may be established as discrete elements or control volumes in a model in a variety of different ways, and any suitable gridding technique may be employed without departing from the scope of the present disclosure. As shown, the grid 300 may include relative small, fine grid cells 302. The fine grid cells 302 may each be associated with property values (e.g., pressure, saturation, fluid viscosity, fluid density) of a discrete volume of the subterranean domain in the model. A plurality (for example, many) fine grid cells 302 may make up a coarse grid cell 304. The coarse grid cells 304 may define unique sets of fine grid cells 302, such that the coarse grid cells 304 do not overlap.

The grid 300 may also include dual coarse grid cells 306-1 (FIG. 3A), 306-2 (FIG. 3B). The dual coarse grid cells 306-1, 306-2 include a plurality (e.g., many) fine cells 302, and adjacent dual coarse grid cells overlap. For example, the dual coarse grid cells 306-1, 306-2 may overlap, as shown. This is also indicated in FIG. 2 at 206.

There may be a variety of ways to calculate the dual coarse grid cells 306, any of which may be applicable to the present disclosure. In a specific example, however, the boundary for the dual coarse grid cells 306-1, 306-2 may be obtained using one or more rows and/or columns of fine grid cells 302, e.g., located at or near the perimeter of the dual coarse grid cells 306-1, 306-2. Finite element basis functions, for example, pressure functions, flux functions, and/or any other function related to a physical characteristic of the modeled subterranean domain, may then be computed for the subdomain represented by the dual coarse grid cells 306-1, 306-2. The basis functions may then be combined, e.g., linearly, so as to generate the contents of the dual coarse grid cells 306-1, 306-2. Thus, the dual coarse grid cells 306-1, 306-2 may be used to represent the physical characteristic as one or more scalar fields, providing a higher-resolution than the coarse cells 304, but without the overhead of the fine grid cells 302. After combining the basis functions, physical properties such as gravity, capillary pressure, and/or the like, may be accounted for, e.g., by adjusting the dual coarse grid cells 306-1, 306-2.

Referring again to FIG. 2, the method 200 may then proceed to defining a first property matrix based on a physical property represented by the fine grid cells, as at 208. The property matrix may be determined based on pressure, saturations, phase viscosity, density and/or mobility represented by the fine cells.

Figure 4A:
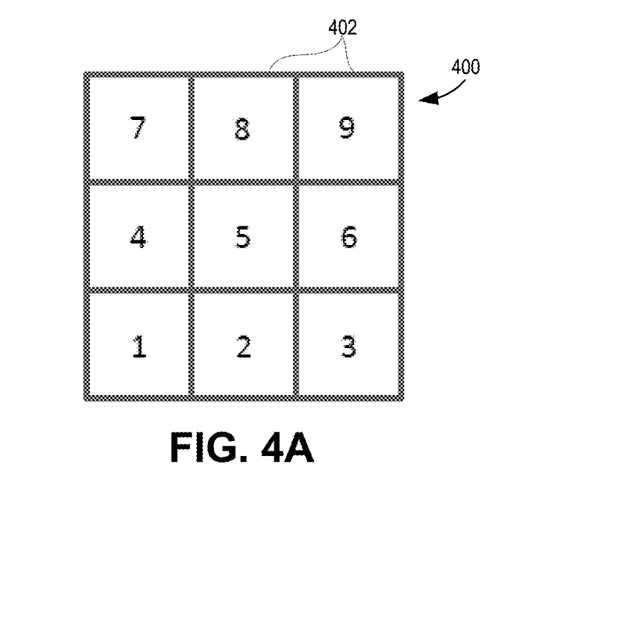
FIG. 4A illustrates a conceptual view of a simple Cartesian grid, according to an embodiment.
Figure 4B:
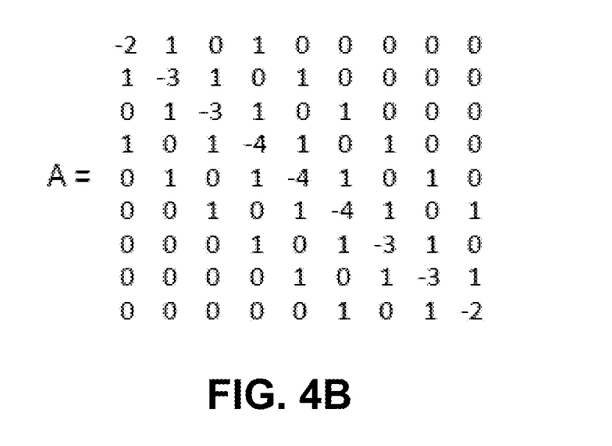
FIG. 4B illustrates a conceptual view of a property matrix constructed based on the simple Cartesian grid, according to an embodiment.

FIGS. 4A and 4B illustrate a conceptual view of a simple Cartesian grid 400 of fine cells 402, and a first property matrix A, respectively, according to an embodiment. In this single phase example, the fine grid cells are numbered 1-6. Fluid velocity v from cell i to cell j may be $v_{ij}=t_{ij}(p_i-p_j)$, where $t_{ij}$ is the transmissibility between cells i and j, $p_i$ is the pressure in cell i, and $p_j$ is the pressure in cell j. Accordingly, a mass balance for cell i may be expressed as $\Sigma_j v_{ij}=q_i$, where $q_i$ is a source or sink in cell i.

To calculate the first property matrix A, the transmissibility represented by the fine cells may be employed. In various embodiments, the transmissibility across the boundary between cells i and j, referred to as $t_{ij}$, may be computed from the cell geometry and rock and fluid properties of the cell (permeability, fluid composition, etc.), and may not in general uniform. For purposes of illustrating the construction of the first property matrix A, however, it is simplistically set to a value of 1 for the interfaces in this example. Accordingly, for each interface between cells i and j. In the first property matrix A, $A_{ij}=-t_{ij}$, and $t_{ij}$ is added to the diagonal element $A_{ii}$.

Cells 1 and 2 may be an illustrative example. Cells 1 and 2 form an interface or boundary therebetween (e.g., they are adjacent to one another). According to the simplistic example, the transmissibility therebetween is 1, in either direction. Thus, $t_{12}=t_{21}=1$, and the first property matrix A elements of the same subscripts are also equal to 1. The second step is to add $t_{ij}$ to $A_{ii}$ and thus elements $A_{11}$ and $A_{22}$ would be increased by 1 in this example. Since cells 1 and 4 also share a boundary, $A_{14}$ is also 1, which also results in the value of $A_{11}$ being further increased by 1. Thus, at the end of the calculation for this simple case, the element $A_{11}$ is 2. This may be repeated for the remaining cells of the first property matrix A.

With the first property matrix A determined, the method 200 may proceed to identifying a subset $\{c_i\}$ of (e.g., one or more of) the fine grid cells that are contained in two or more of the dual coarse grid cells, as at 210, such that one $c_i$ is contained in each coarse cell. For example, these may be referred to as "overlapped" fine cells. Referring again to FIGS. 3A and 3B, in some embodiments, one, some, or each of the fine grid cells 302 may be contained in two or more dual coarse grid cells. However, the subset of identified fine grid cells 302 may be those that border a particular boundary between two coarse grid cells 304, e.g., coarse grid cells 1, 4. The method 200 may thus determine the flow across a boundary 308 between these two cells 1, 4 based on the value for each dual coarse grid cell 306-1, 306-2 that intersects the boundary, e.g., using the relatively small number of overlapped fine grid cells, which are populated based on the values contained in the dual coarse grid cells, according to the basis function(s).

To accomplish this, a domain decomposition technique may be employed, whereby one or more properties calculated in the identified subset may be interpolated back to the model at large. Accordingly, the method 200 may include calculating a prolongation matrix P and a restriction matrix R, as at 212. The complex processes of calculating prolongation and restriction matrices in multiscale modeling are known to those of skill in the art and are not described herein in detail herein.

The method 200 may proceed to determining a second property matrix, e.g., the matrix $A_c$, for the identified subset, as at 214. In general, the mass balance calculation proceeds as a linear problem:

$$Ap=q$$

where A is the first property matrix for the grid, p is a vector including the pressures in the grid cells, and q is a vector including the source/sink values in the cells.

The multiscale method solves this problem by representing pressure in terms of interpolation $p=Pp_c$ where the vector $P_c$ is smaller than p and represents the pressures in the identified subset of fine cells, as identified at 210. Thus, the vector $P_c$ is the solution to a linear system $A_cp_c=q_c$, where $A_c=RAP$ and $q_c=Rq$. In some situations, computing a matrix triple product $A_c=RAP$ may be time consuming, given the potentially large size of each of the matrices.

In some embodiments, the method 200 proceeds by first computing the product of the first property matrix and the prolongation matrix (AP), thereby generating an intermediate product, as at 216. Each element in AP is an inner product of a row vector in A and a column vector in P. If either of these vectors is zero, the corresponding matrix element in AP may be zero.

The columns $p_i$ of P constitute a basis for the interpolation of the pressures in the identified subset of fine cells to the grid. The basis is compact in the sense that each $p_i$ has non-zero entries in a small region of the reservoir surrounding a coarse cell. The non-zero entries may be, in particular, the union of the dual coarse grid cells containing or intersecting the coarse cell. For example, in FIG. 3A, coarse cell 1 overlaps with four dual coarse cells, and the basis $p_1$ has support in the four dual coarse cells. Each basis vector $p_i$ is the solution of a modified linear system $A_ip_i=b_i$, where the right-hand side $b_i$ has a single non-zero entry for $c_i$. The original linear system is modified on rows corresponding to cells in the overlap region (cells that are part of more than one dual coarse grid cell). In other words, $A_i-A$ has nonzero rows for cells in the overlap between dual coarse grid cells.

Each column of AP is a matrix vector product $Ap_i$. From the discussion above, the matrix-vector product can be written as $Ap_i=Ap_i-(A_ip_i-b_i)=(A-A_i)p_i+b\_i$. It follows that Ap_i may be non-zero for cells on overlap between subdomains, and zero otherwise. Thus, AP may have rows containing all zero-value elements for cells not in the overlap between subdomains. Accordingly, these rows can be preset to zero, as at 218, without conducting matrix multiplication operations, in order to hasten the determination of the intermediate product matrix in 216.

The method 200 may then calculate the product of the restriction matrix and the intermediate product (R(AP)), as at 220. This may yield the second property matrix $A_c$ which in turn enables the calculation of the pressures $p_c$, as at 222, which may then be interpolated using the prolongation matrix, as explained above. Further, the calculation of the pressure vector $p_c$ and/or p may be employed to modify the model, e.g., as part of a timestep simulation, stemming from the calculation of the second property matrix $A_c$. Accordingly, the method 200 may include adjusting a fluid flow in the model, as at 224, and/or displaying such adjusted fluid flow, as at 226.

The method 200 may then determine if another iteration is to be performed. For example, the method 200 may determine if another subset is to be identified, as at 228, for example, along another boundary between two adjacent coarse cells 304. If it is, the method 200 may return to identifying a subset of the fine cells, as at 210, e.g., other than one or more sets that may have already been calculated. If the determination at 228 is 'NO', the method 200 may proceed to determining if another timestep is to be calculated, as at 230. If it is, the method 200 may return to identifying (a first) subset of fine scale cells, at 210. Otherwise, the method 200 may terminate.

Figure 5:
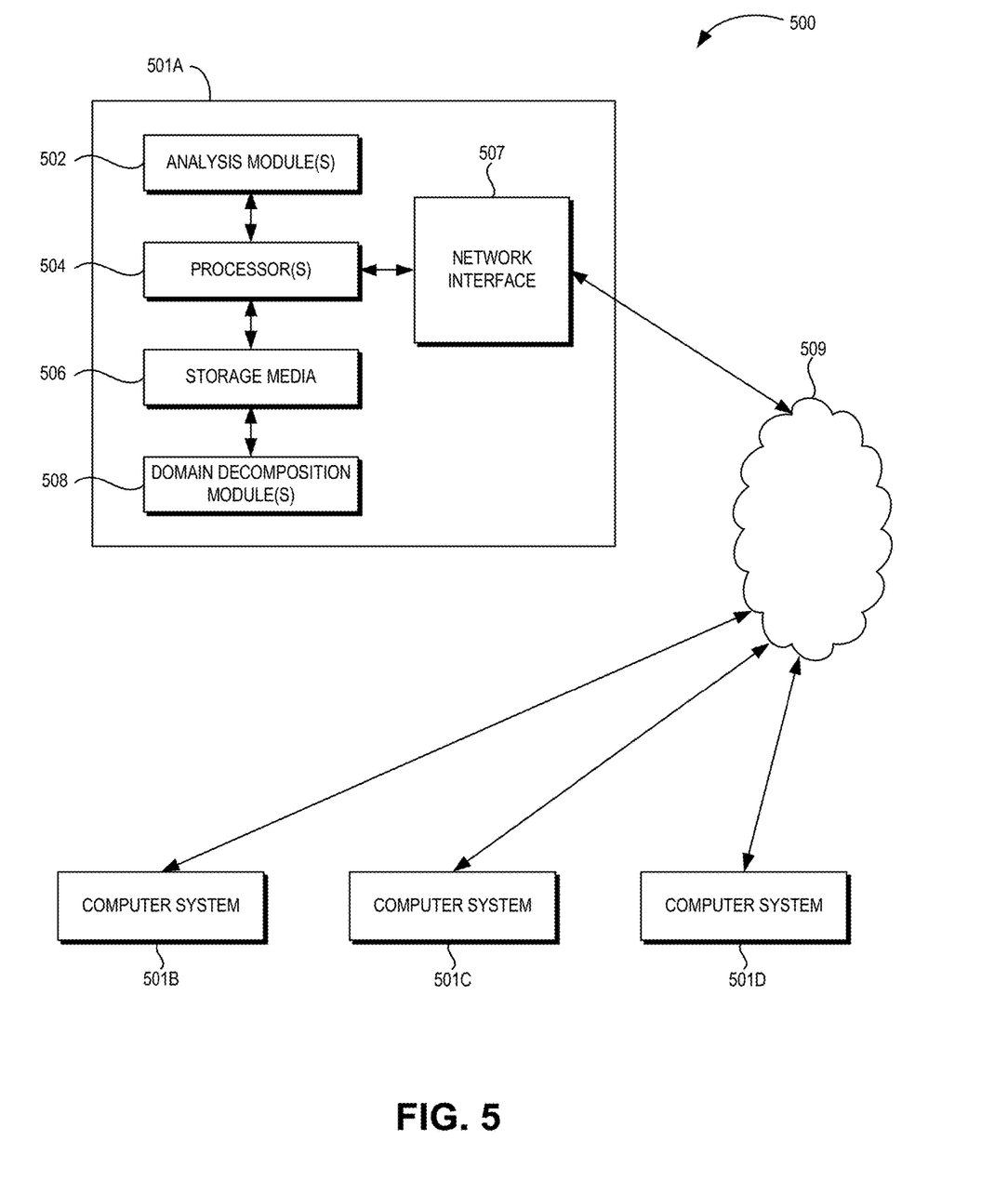
FIG. 5 illustrates a schematic view of a computing system, according to an embodiment.

In some embodiments, the methods of the present disclosure may be executed by a computing system. FIG. 5 illustrates an example of such a computing system 500, in accordance with some embodiments. The computing system 500 may include a computer or computer system 501A, which may be an individual computer system 501A or an arrangement of distributed computer systems. The computer system 501A includes one or more analysis modules 502 that are configured to perform various tasks according to some embodiments, such as one or more methods disclosed herein. To perform these various tasks, the analysis module 602 executes independently, or in coordination with, one or more processors 504, which is (or are) connected to one or more storage media 506. The processor(s) 504 is (or are)

also connected to a network interface 507 to allow the computer system 501A to communicate over a data network 509 with one or more additional computer systems and/or computing systems, such as 501B, 501C, and/or 501D (note that computer systems 501B, 501C and/or 501D may or may not share the same architecture as computer system 501A, and may be located in different physical locations, e.g., computer systems 501A and 501B may be located in a processing facility, while in communication with one or more computer systems such as 501C and/or 501D that are located in one or more data centers, and/or located in varying countries on different continents).

A processor may include a microprocessor, microcontroller, processor module or subsystem, programmable integrated circuit, programmable gate array, or another control or computing device.

The storage media 506 may be implemented as one or more computer-readable or machine-readable storage media. Note that while in the example embodiment of FIG. 5 storage media 506 is depicted as within computer system 501A, in some embodiments, storage media 506 may be distributed within and/or across multiple internal and/or external enclosures of computing system 501A and/or additional computing systems. Storage media 506 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY® disks, or other types of optical storage, or other types of storage devices. Note that the instructions discussed above may be provided on one computer-readable or machine-readable storage medium, or alternatively, may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 500 contains one or more domain decomposition module(s) 508. In the example of computing system 500, computer system 501A includes the domain decomposition module 508. In some embodiments, a single domain decomposition module may be used to perform some aspects of one or more embodiments of the methods disclosed herein. In alternate embodiments, a plurality of domain decomposition modules may be used to perform some aspects of methods herein.

It should be appreciated that computing system 500 is merely one example of a computing system, and that computing system 500 may have more or fewer components than shown, may combine additional components not depicted in the example embodiment of FIG. 5, and/or computing system 500 may have a different configuration or arrangement of the components depicted in FIG. 5. The various components shown in FIG. 5 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of the present disclosure.

Geologic interpretations, models, and/or other interpretation aids may be refined in an iterative fashion; this concept is applicable to the methods discussed herein. This may include use of feedback loops executed on an algorithmic basis, such as at a computing device (e.g., computing system 500, FIG. 5), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principals of the disclosure and its practical applications, to thereby enable others skilled in the art to best utilize the disclosed embodiments and various embodiments with various modifications as are suited to the particular use contemplated.

What is claimed is:

1. A method for multi-scale modeling, comprising:
obtaining a model of a subterranean domain, the model comprising a plurality of fine cells and a plurality of subdomains, wherein respective subdomains of the plurality of subdomains comprise two or more of the plurality of fine cells;
determining a first matrix for the plurality of fine cells based at least in part on a physical property value represented by respective fine cells of the plurality of fine cells;
identifying one or more overlapped cells of the plurality of fine cells, wherein each of the one or more overlapped cells is part of at least two of the plurality of subdomains;
determining, using a processor, a second matrix corresponding to the physical property value, comprising:
determining an intermediate product by multiplying the first matrix by a prolongation matrix, wherein determining the intermediate product comprises setting a row of the intermediate product to all zeros, wherein the row corresponds to the plurality of fine cells that are not the one or more overlapped cells and are not part of the at least two of the plurality of subdomains that include the one or more overlapped cells; and
multiplying the intermediate product by a restriction matrix; and
adjusting a fluid flow in the model based at least partially on the second matrix.

2. The method of claim 1, wherein the physical property comprises pressure in the subterranean domain at respective locations represented by the respective fine cells of the plurality of fine cells.

3. The method of claim 1, wherein the plurality of subdomains comprise a plurality of dual coarse grid cells, wherein one or more values represented by the plurality of dual coarse grid cells are calculated based at least in part on a basis function for at least one physical characteristic.

4. The method of claim 1, wherein the model further comprises a plurality of coarse cells, wherein each of the plurality of coarse cells contains two or more of the plurality of fine cells.

5. The method of claim 4, wherein the plurality of coarse cells do not overlap.

6. The method of claim 5, wherein the one or more overlapped cells comprises a subset of the plurality of fine cells that are located proximal to an interface between two of the plurality of coarse cells.

7. The method of claim 1, wherein:
the prolongation matrix multiplied by a first vector representing the physical property value in the one or more overlapped cells equals a second vector representing the physical property value in the plurality of fine cells;
a source/sink vector for the one or more overlapping cells is equal to the restriction matrix multiplied by a source/sink vector for the plurality of fine cells; and
the second matrix multiplied by the first vector equals the source/sink vector for the one or more overlapping cells.

8. The method of claim 1, further comprising displaying the model after adjusting the model.

9. The method of claim 1, wherein the model is constructed based on data collected from a physical source, the physical source comprising at least one of a seismic acquisition device, a well-logging device, or a core-sampling device.

10. A computing system, comprising:
one or more processors; and
a memory system comprising one or more non-transitory computer-readable media storing instructions that, when executed by at least one of the one or more processors, cause the computing system to perform operations, the operations comprising:
obtaining a model of a subterranean domain, the model comprising a plurality of fine cells and a plurality of subdomains, wherein respective subdomains of the plurality of subdomains comprise two or more of the plurality of fine cells;
determining a first matrix for the plurality of fine cells based at least in part on a physical property value represented by respective fine cells of the plurality of fine cells;
identifying one or more overlapped cells of the plurality of fine cells, wherein each of the one or more overlapped cells is part of at least two of the plurality of subdomains;
determining a second matrix corresponding to the physical property value, comprising:
determining an intermediate product by multiplying the first matrix by a prolongation matrix, wherein determining the intermediate product comprises setting a row of the intermediate product to all zeros, wherein the row corresponds to the plurality of fine cells that are not the one or more overlapped cells and are not part of the at least two of the plurality of subdomains that include the one or more overlapped cells; and
multiplying the intermediate product by a restriction matrix; and
adjusting a fluid flow in the model based at least partially on the second matrix.

11. The system of claim 10, wherein the physical property comprises pressure in the subterranean domain at respective locations represented by the respective fine cells of the plurality of fine cells.

12. The system of claim 10, wherein the plurality of subdomains comprise a plurality of dual coarse grid cells, wherein one or more values represented by the plurality of dual coarse grid cells are calculated based at least in part on a basis function for at least one physical characteristic.

13. The system of claim 10, wherein the model further comprises a plurality of coarse cells, wherein each of the plurality of coarse cells contains two or more of the plurality of fine cells.

14. The system of claim 10, wherein the one or more overlapped cells comprises a subset of the plurality of fine cells that are located proximal to an interface between two of the plurality of coarse cells.

15. The system of claim 10, wherein:
the prolongation matrix multiplied by a first vector representing the physical property value in the one or more overlapped cells equals a second vector representing the physical property value in the plurality of fine cells;
a source/sink vector for the one or more overlapping cells is equal to the restriction matrix multiplied by a source/sink vector for the plurality of fine cells; and
the second matrix multiplied by the first vector equals the source/sink vector for the one or more overlapping cells.

16. A non-transitory computer-readable medium storing instructions that, when executed by one or more processors of a computing system, cause the computing system to perform operations, the operations comprising:
obtaining a model of a subterranean domain, the model comprising a plurality of fine cells and a plurality of subdomains, wherein respective subdomains of the plurality of subdomains comprise two or more of the plurality of fine cells;
determining a first matrix for the plurality of fine cells based at least in part on a physical property value represented by respective fine cells of the plurality of fine cells;
identifying one or more overlapped cells of the plurality of fine cells, wherein each of the one or more overlapped cells is part of at least two of the plurality of subdomains;
determining a second matrix corresponding to the physical property value, comprising:
determining an intermediate product by multiplying the first matrix by a prolongation matrix, wherein determining the intermediate product comprises setting a row of the intermediate product to all zeros, wherein the row corresponds to the plurality of fine cells that are not the one or more overlapped cells and are not part of the at least two of the plurality of subdomains that include the one or more overlapped cells; and
multiplying the intermediate product by a restriction matrix; and
adjusting a fluid flow in the model based at least partially on the second matrix.

17. The medium of claim 16, wherein:
the prolongation matrix multiplied by a first vector representing the physical property value in the one or more overlapped cells equals a second vector representing the physical property value in the plurality of fine cells;

a source/sink vector for the one or more overlapping cells is equal to the restriction matrix multiplied by a source/sink vector for the plurality of fine cells; and the second matrix multiplied by the first vector equals the source/sink vector for the one or more overlapping cells.

* * * * *